United States Patent [19]

Freeman et al.

[11] Patent Number: 5,531,250
[45] Date of Patent: Jul. 2, 1996

[54] DEVICE FOR PLUGGING THE INTERIOR OF A PIPE

[75] Inventors: Eric N. Freeman, Sapulpa; David L. Blevins, Tulsa; Gene R. Ralls, Tulsa; Bill D. Andrew, Tulsa; Buddy A. Wilson, Sapulpa; Coy D. Osburn, Tulsa, all of Okla.

[73] Assignee: TDW Delaware, Inc., Tulsa, Okla.

[21] Appl. No.: 238,430

[22] Filed: May 5, 1994

[51] Int. Cl.⁶ .................................................. F16L 55/10
[52] U.S. Cl. ............................................ 138/94; 138/89
[58] Field of Search ................................ 138/89, 94, 90

[56] References Cited

U.S. PATENT DOCUMENTS

| | | | |
|---|---|---|---|
| 1,695,187 | 12/1928 | Goodman | 138/94 |
| 1,887,542 | 11/1932 | Carr | 138/94 |
| 2,812,778 | 11/1957 | Ver Nooy | 138/94 |
| 3,025,885 | 3/1962 | Ver Nooy | 138/94 |
| 3,442,295 | 5/1969 | Ver Nooy | 138/94 |
| 3,614,252 | 10/1973 | Rose | 408/9 |
| 3,626,475 | 12/1971 | Hicks | 138/94 |
| 3,665,966 | 5/1972 | Ver Nooy | 138/93 |
| 4,202,377 | 5/1980 | Harrison | 138/94 |
| 4,579,484 | 4/1986 | Sullivan | 408/56 |
| 4,880,028 | 11/1989 | Osburn | 137/315 |
| 5,082,026 | 1/1992 | Smith | 138/94 |
| 5,297,581 | 3/1994 | Godfrey | 138/89 |

FOREIGN PATENT DOCUMENTS

| | | | |
|---|---|---|---|
| 0804790 | 11/1958 | United Kingdom | 138/94 |
| 1340431 | 12/1973 | United Kingdom | 138/94 |

*Primary Examiner*—David Scherbel
*Assistant Examiner*—James F. Hook
*Attorney, Agent, or Firm*—Head, Johnson & Kachigian

[57] ABSTRACT

An apparatus for plugging the interior of a pipe that is penetrated by an axis opening including an upright tubular plugger housing attachable at its lower end to have communication with the interior of the pipe through the opening. An elongated vertical cylindrical control bar is provided with a plugger at its lower end, the plugger being positioned through the opening into the interior of the pipe to close against further flow of fluid through the pipe. A jack is affixed to the plugger housing upper end and telescopically receives the control bar, the jack being pivotally affixed to the housing so that the control bar, having a plugger on the lower end thereof, can be pivoted relative to the housing and thereby relative to the pipe for proper positioning of the plugger in the pipe. The jack serving to axially downwardly or upwardly advance the control bar so that a plugger can be installed or removed from a pipe, the jack providing force to expand a sealing cup on the plugging head to seal the inside of the pipe. A control bar clamp and latch are used for locking the plugger head in the plugging position.

20 Claims, 11 Drawing Sheets

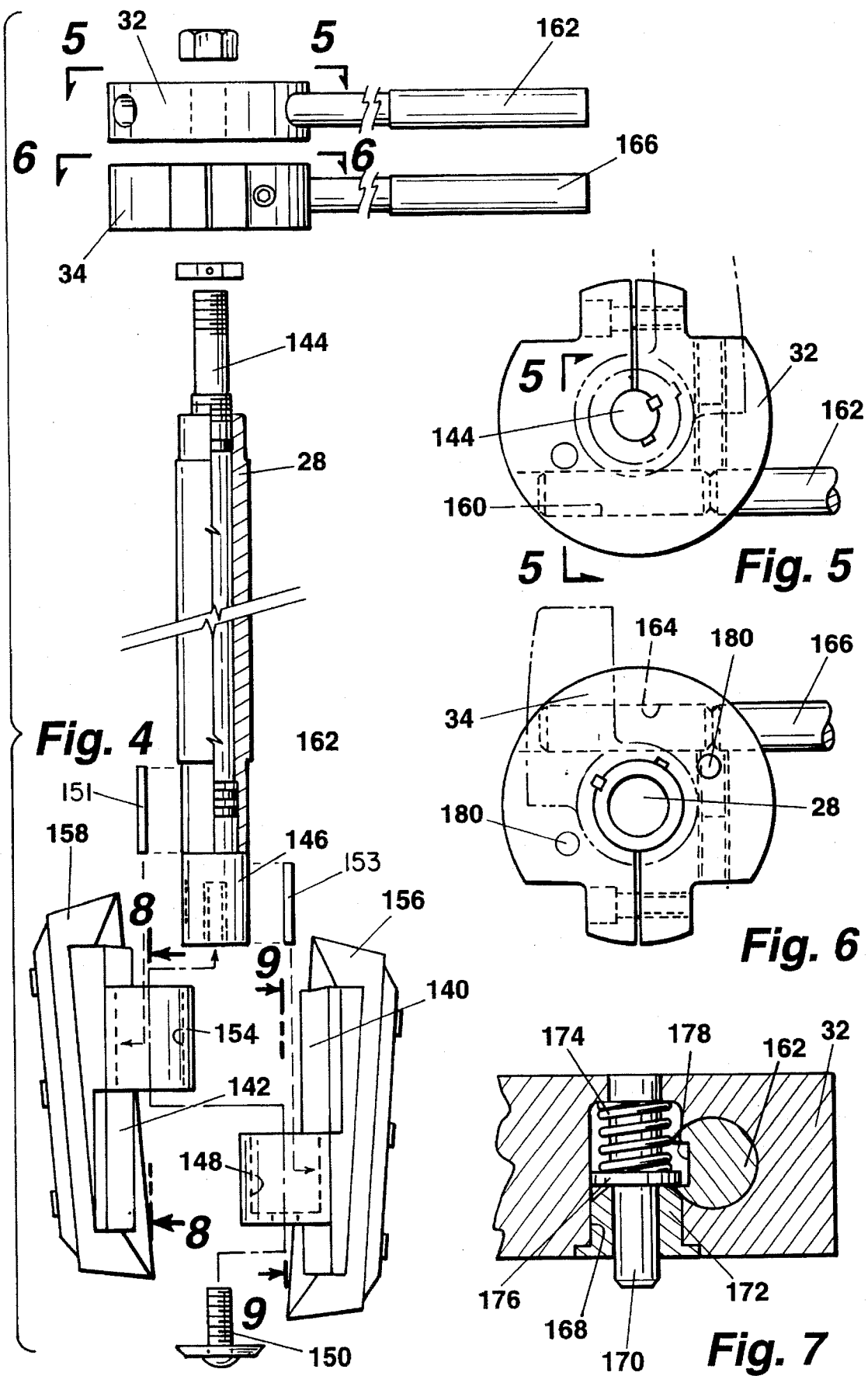

DEVICE FOR PLUGGING THE INTERIOR OF A PIPE

CROSS-REFERENCE TO RELATED APPLICATIONS

This application is not related to any pending patent applications.

CROSS-REFERENCE TO MICROFICHE APPENDIX

This application is not related to any microfiche appendix.

BACKGROUND OF THE INVENTION

This invention relates to a device for plugging the interior of a pipe having an internal cylindrical surface. The pipe is provided with an access opening with a diameter which may be substantially equal to or smaller than the diameter of the pipe internal cylindrical surface.

Devices exist for forming an opening in the wall of a pipeline even while the pipeline is under liquid or gas pressure. For references to devices that can be used for tapping a pipeline while under pressure, see the following U.S. patents: U.S. Pat. No. 3,614,252 entitled "Tapping Apparatus"; U.S. Pat. No. 4,579,484 entitled "Underwater Tapping Machine"; and U.S. Pat. No. 4,880,028 entitled "Completion Machine". These previously issued patents are incorporated herein by reference.

In order to terminate the flow through a portion of a pipeline that is under liquid or gas pressure after it has been tapped by a tapping machine as referred to in the above-referenced patents, it is frequently necessary to plug the interior of the pipeline. Normally, in laying out a piping system, valves are installed in the pipeline where it will be necessary to stop or regulate the flow of liquids or gases through the pipeline, but in many instances, it becomes necessary to terminate flow in a portion of a length of a pipeline that does not have a valve previously installed for that purpose. The present invention is directed to a device for performing this service. Others have previously suggested plugging devices for plugging the interior of a pipeline through an opening formed in the wall of the pipeline. For background reference to pipe pluggers, see the following U.S. patents which are incorporated herein by reference: U.S. Pat. No. 3,665,966 entitled "Pipe Plugger" issued May 30, 1972 and U.S. Pat. No. 3,626,475 entitled "High Temperature Pipe-Plugging Apparatus" issued Dec. 7, 1971.

The present disclosure relates to improvements in a pipe plugging device. The improvements to be described are particularly important in plugging the interior of a pipe that is under substantial liquid or gas pressure.

BRIEF SUMMARY OF THE INVENTION

This invention relates to a device for plugging the interior of a pipe having an internal cylindrical surface. The pipe is provided with an access opening with a diameter which may be substantially equal to or smaller than the diameter of the pipe internal cylindrical surface. The plugging device includes an upright tubular plugger housing having a flange or other means at the lower end for attachment to a saddle fitting or other device that is in communication with an opening in the pipeline. In the typical operation where a hole has been tapped in an existing pipe that is subject to liquid or gas pressure, a sandwich-type valve is secured to a flange that encompasses the opening in the pipe. The plugger housing is attached to the top of the sandwich valve so that when the valve is open communication is provided between the interior of the plugger housing and the interior of the pipe through the opening. A housing closure member is pivotally secured to the upper end of the plugger housing. The housing closure member is a tubular member having an integral truncated spherical external diameter, that is, a ball portion having a cylindrical opening through it. The upper end of the tubular plugger housing has a ball seat and a closure plate that retains the closure member spherical portion in contact with the spherical seat. Telescopically received within the closure member is an elongated vertical cylindrical control bar. Affixed to the control bar, at the lower end thereof, is a plugging member. The plugging member may be in various forms. In one form, an elastomeric cup secured to a fixed plugger head that is attached to the lower end of the control bar. The control bar can be positioned to extend the plugger head into the interior of the pipe slightly past the access opening to close the interior of the pipe.

Another form of plugger head includes an elastomeric cup supported to a backing plate. The backing plate is movably supported to a control bar head at the lower end of the control bar, the backing plate having a downwardly extending foot. By means of inclined slots in the backing plate and rollers supported by the control bar head, the backing plate is forced forwardly as the control bar is forced downwardly so that the foot engages the lower internal surface of the pipe. The forward movement of the backing plate having the elastomeric cup sandwiched between it and a front plate forces the elastomeric cup radially into the interior wall of the pipe to further close the pipe against fluid flow. This provides for an enhanced sealing capability against very low fluid pressures and/or in undesirable pipe internal conditions.

A third type of plugger head, that is illustrated and described in this invention, is a folding head. In this type plugger the head is in two halves, each half containing one-half of a cylindrical cup. The plugger head is folded and then is inserted into the interior of a pipe through an opening formed therein that needs to be about 70% of the diameter of the pipe I.D. Then the plugger head is unfolded to form a plug in the interior of the pipe to block the flow of liquid or gas therethrough. When a folded plugger head is employed, the control bar is formed of two portions, that is an outer tubular portion and an internal rod portion. By the use of handles at the upper end of the control bar inner and outer portions, the different halves of the folding plugger head can be manipulated to move the head from the folded to the unfolded position and vice versa.

In one embodiment of the invention the vertical position of the control bar and the plugger head can be controlled manually by the operator physically pushing the control bar downwardly to move the plugger head into the pipeline or to pull the control bar upwardly to move the plugger head from the interior of the pipeline into the plugger housing. This system functions satisfactorily if plugging operation is done on a pipe having relatively low liquid or gas pressure. However, when attempting to plug a pipe having greater pressure, it becomes difficult to manually elevationally position the control bar. The reason is that the liquid or gas pressure exerts an upward force on the control bar that is directly related to the pressure in pound per square inch times the cross-sectional area of the control bar. To solve this problem, the present disclosure includes the use of a jack. That is, a jack is attached to the upper end of the housing closure member, the jack telescopically receiving the control bar. By means of actuators surrounding the control bar and springs that apply force on the actuators, a jack handle can be employed to apply force between the actuators or between the jack housing and an upper actuator to move the control bar by incremental steps. In one position of the handle, the control bar can be jacked downwardly to move a plugger head into the interior of a pipeline. In another position of the handle, the control bar can be jacked upwardly to lift the plugger head out of the interior of the pipeline and into the plugger housing.

The jack includes a drag adjust so that the gripping force required to move the control bar upwardly against gravity can be adjusted.

Another feature of the apparatus for plugging the interior of a pipe of this invention is the employment of a clamping member that is attached either to the upper end of the housing closure member if no jack is employed or, if a jack is employed, to the upper end of the jack so that the operator can lock the control bar in fixed elevational positions and, in combination with a latch described later, in semi-fixed rotational positions relative to the housing closure member.

To insert a plugger head into the interior of a pipe that is penetrated by an opening, the plugger head must be positioned in the pipe interior beyond the opening in order to effect complete seal around the full 360° perimeter of the plugger head cup. For this reason, the control bar must be pivoted in the direction of the pipe interior in which the plugger is to be located. An important feature of this disclosure is the provision of means to lock the control bar in a fixed angular position relative to the plugger housing so that it remains in such position while the operator completes the plugging operation.

Another feature of the invention of this disclosure that relates to use of a folding plugger head is a means of locking the plugger head in the unfolded position for plugging a pipe or for locking the folding plugger head in the folded position when the operator desires to remove the plugger head from the interior of the pipe. This means of locking the folding plugger head in a folded or unfolded position is controlled by one of a pair of handles that is attached to the upper ends of the inner and outer portions of the control bar. More specifically, to operate a folding plugger head a handle is employed that extends radially from the control bar outer tubular portion and a second handle is affixed to and extends radially from the control bar inner cylindrical portion. By rotating one of the handles about its longitudinal axis, a pin is withdrawn that otherwise locks the handles in fixed relative position to each other.

A more complete understanding of the invention will be obtained from the following description of the preferred embodiments and claims taken in conjunction with the attached drawings.

DESCRIPTION OF THE DRAWINGS

FIG. 2 is an elevational view that is taken in a plane that is perpendicular to the axis of the pipe to which the device is attached, the pipe not being shown in this figure.

FIG. 4 is an exploded view of a control bar of the type that is used with a folding plugger. The components of a folding plugger are shown below the control bar and manual control devices that are used to rotate the inner and outer portions of the control bar are shown above the control bar. The control bar of FIG. 4 is the type that is illustrated in FIGS. 1, 2, and 3.

FIG. 5 is a horizontal view taken along the line 5—5 of FIG. 4 showing the upper handle connector that is attached to the internal portion of the control bar.

FIG. 6 is view looking downwardly as taken along the line 6—6 of FIG. 4 showing the lower handle connector that is affixed to the outer tubular portion of the control bar.

FIG. 7 is an enlarged segmented view of a portion of the upper handle connector showing the means by which a handle can be rotated to retract a locking pin that is used to lock the handle connectors in preselected positions relative to each other.

FIG. 22 is taken along the line 22—22 of FIG. 3 and shows the clamp as supported on the top of a jack.

FIG. 23 illustrates the invention wherein a jack is not employed, that is, where the device is used to control operations internally of a pipe when the pressure in the pipe is low enough that the control bar can be safely raised and lowered manually by the operator without the need of the mechanical advantage that is obtained by use of a jack.

DETAILED DESCRIPTION

Figure 1:
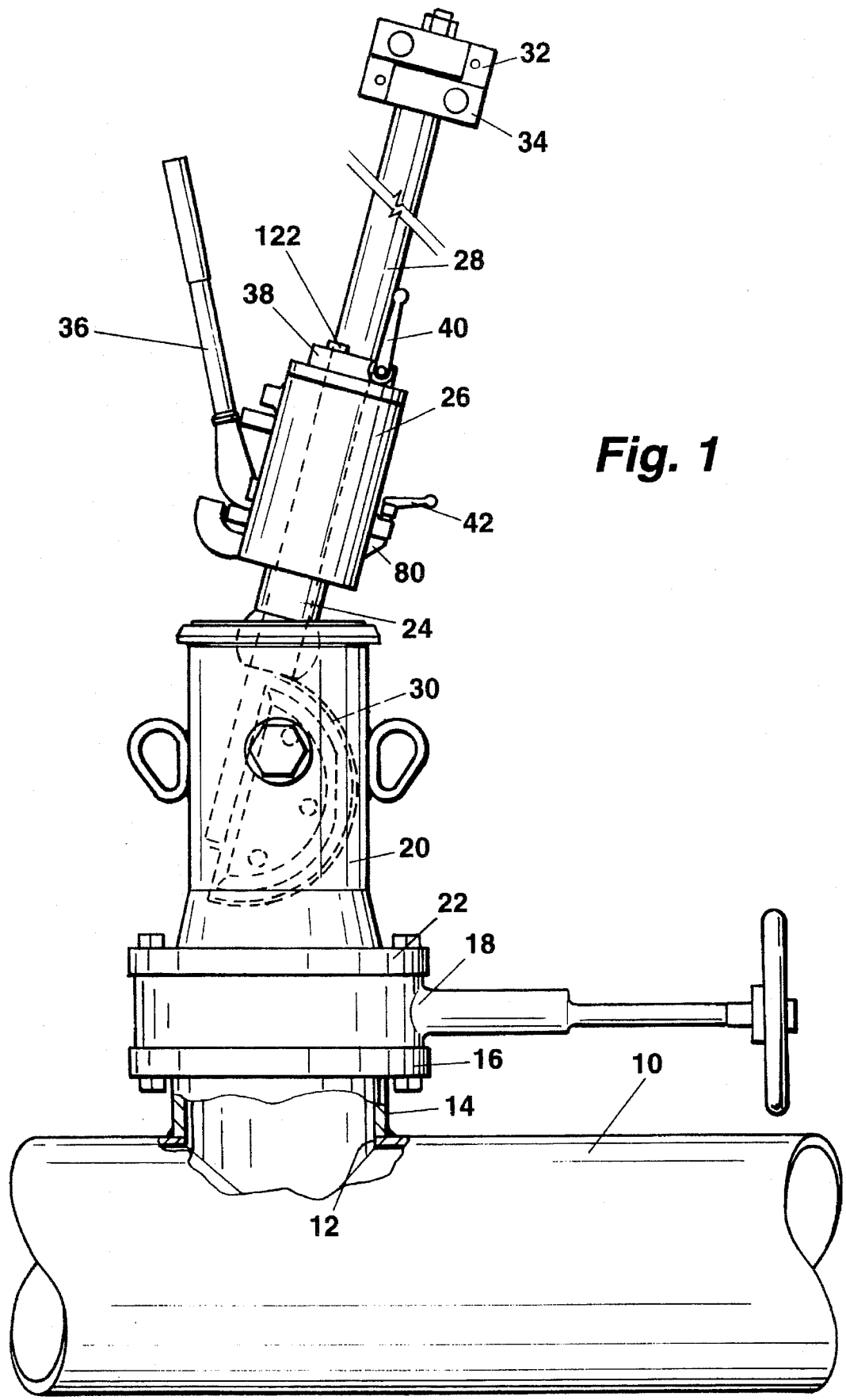
FIG. 1 is an elevational view of a pipeline to which is attached a flange that communicates with an access opening in a pipe. Supported on the flange is a sandwich-type valve that is used to open and close communication with the access opening. Positioned on top of the sandwich valve is a plugger housing and on the plugger housing is a jack. A control bar is telescopically received by the plugger housing and jack and is used in installing a plugger head into the pipe through the access opening. The plugger head can then be positioned to plug the pipeline against flow of liquid or gas therethrough.

Referring to the drawings and first to FIG. 1, a pipe indicated by the numeral 10 has an opening 12 in the sidewall thereof. Opening 12 can be formed such as by a tapping operation as revealed in U.S. Pat. Nos. 3,614,252; 4,579,484 and 4,880,028, that is, opening 12 can be formed in pipe 10 even while the pipe is under liquid or gas pressure. In conjunction with the formation of an opening in a pipe that is under pressure, a saddle fitting or some other form of fitting 14 is first welded to the exterior of the pipe, the fitting having a flange 16, or external threads to receive a threaded valve. Secured to flange 16 is a sandwich valve 18 which can be opened and closed to provide full diameter access to opening 12, and thus, to the opening of pipe 10. When the sandwich valve is closed, devices can be attached to the top of it, and when opened, access from the devices into the interior of the pipe is provided. The saddle fitting 14 and sandwich valve 18 are not part of the invention but are illustrative of the apparatus with which the invention is employed. This invention relates to apparatus that is secured to the top of sandwich valve 18 as a means of plugging the interior of the pipe. It is to be understood that the apparatus of this invention is not entirely dependent of the use of a sandwich valve—other types in entry devices may be employed but a sandwich valve is typical of the installations to which this invention may be applied.

A tubular plugger housing 20 is provided with the flange 22 at the lower end that can be attached directly to sandwich valve 18, or with external threads that may be used with smaller, threaded valves. The lower end configuration of the tubular plugger housing 20 depends on the device to which it is attached—thus, flange 22 is an illustration of one means of attaching it to apparatus secured to pipe 10.

Pivotally secured to the upper end of tubular plugger housing 20 is a pivoted housing closure member 24. Secured to the top of housing closure member 24 is jack 26. Telescopically received within the housing closure member 24 and jack 26 is a cylindrical control bar 28. At the lower end of control bar 28 is a plugging device shown in dotted outline and indicated by the numeral 30. As will be described subsequently, the plugging device 30 may take a variety of forms (three of which will be described subsequently) but, regardless to the form, it is employed to sealably close the interior of pipe 10 against the flow of liquid or gas therethrough.

The upper end of control bar 28 has an upper handle connector 32 and a lower handle connector 34 which are used to manipulate control bar 28 and thereby plugger 30.

Jack 26 is used to move control bar 28 up and down, that is vertically or at least in a vertical plane, with respect to plugger housing 20, the jacking operations being achieved by the manual manipulation of jack handle 36.

Attached to the upper end of jack 26 is a bar clamp 38 controlled by lever 40. Bar clamp 38 can be used to lock the control bar in elevational positions with respect to the housing closure member 24.

A control bar drag adjust operated by lever 42 is used to control the resistance against downward movement of the control bar 28. All of these components will now be described in greater detail.

Figure 2:
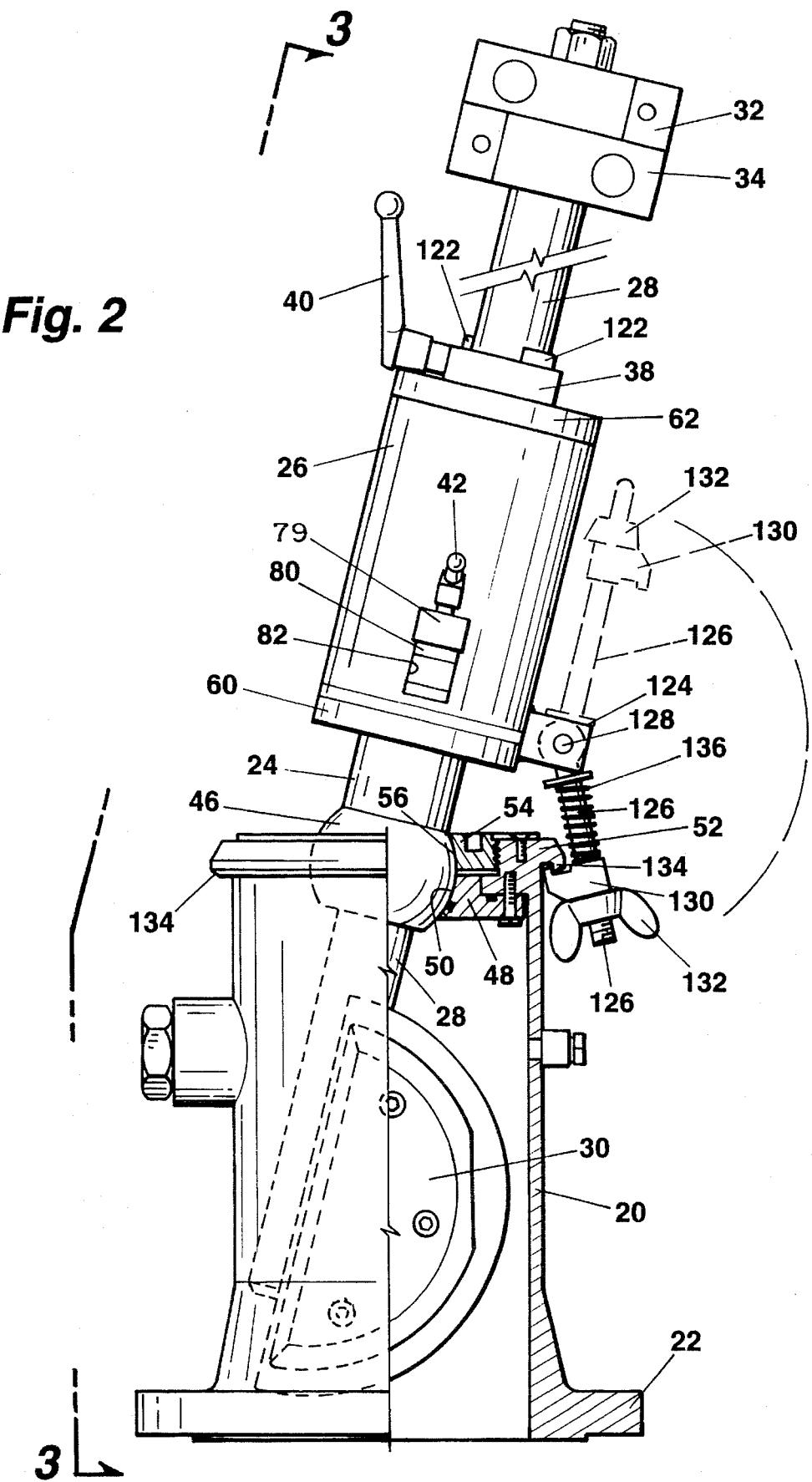
FIG. 2 is an enlarged view of the device for plugging the interior of a pipe as shown in FIG. 1, the plugger housing being shown partially in cross-section.
Figure 3:
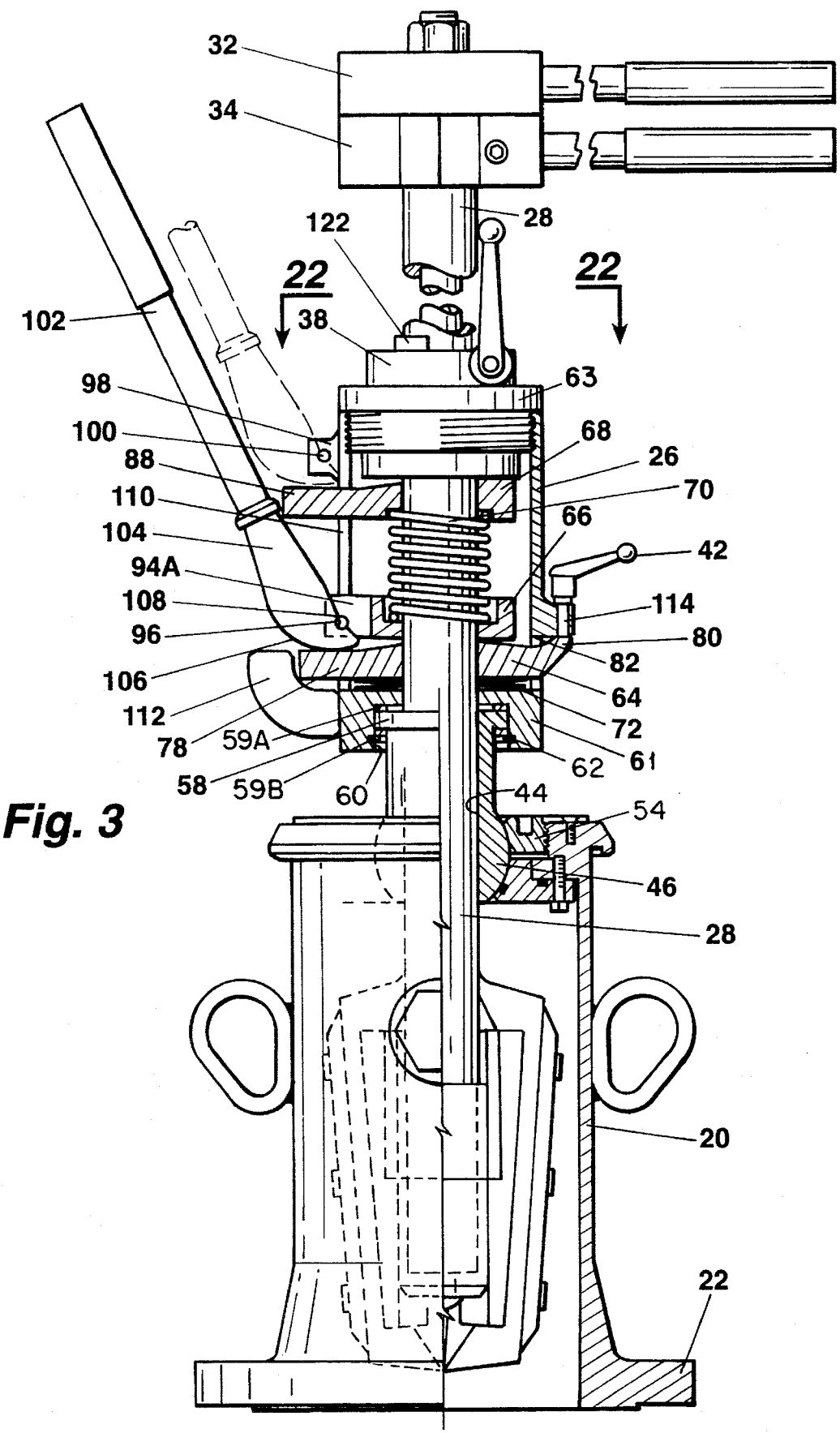
FIG. 3 is an elevational view as taken along the line 3—3 of FIG. 2. The plugger housing is shown partially cut away and the jack is shown cut away to reveal the interior portions. The jack provides means for jacking the control bar downwardly, such as to install a plugger into a pipe, or upwardly to remove a plugger from a pipe.
Figure 9:
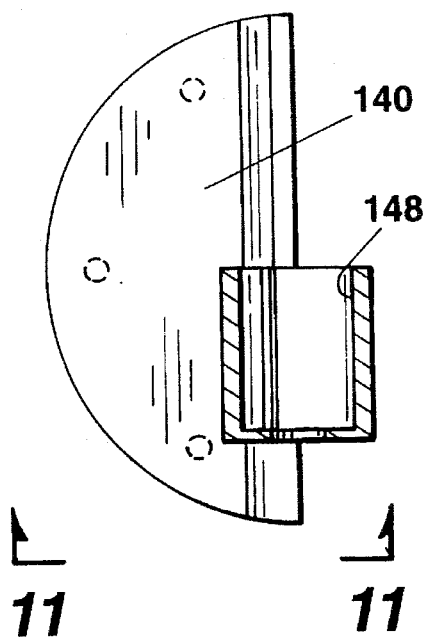
FIG. 9 is an elevational view of a second half of the plugger head with the tubular portion that is used to attach it to the lower end of the inner control bar being shown in cross-section.
Figure 8:
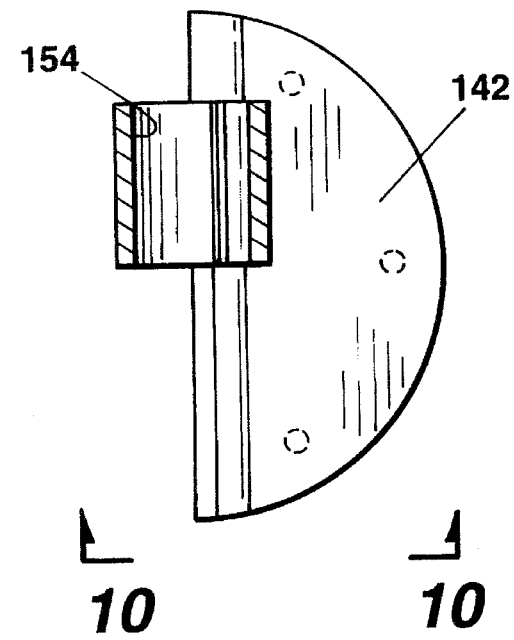
FIG. 8 is an elevational view of a plugger head first half, the tubular portion that is used to attach it to the lower end of the outer control bar being shown in cross-section.
Figure 11:
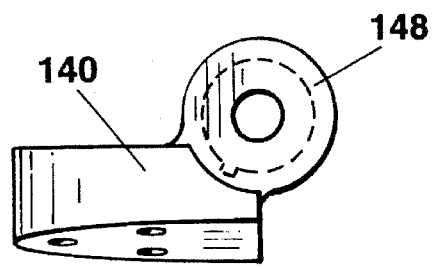
FIG. 11 is an end view of the plugger head second half as taken along the line 11—11 of FIG. 9.
Figure 10:
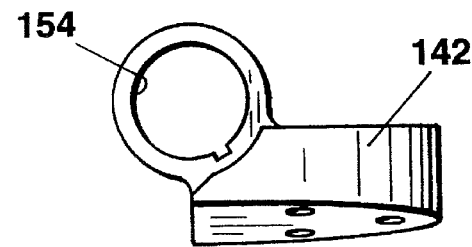
FIG. 10 is an end view of a plugger head first half as taken along the line 10—10 of FIG. 8.
Figure 13:
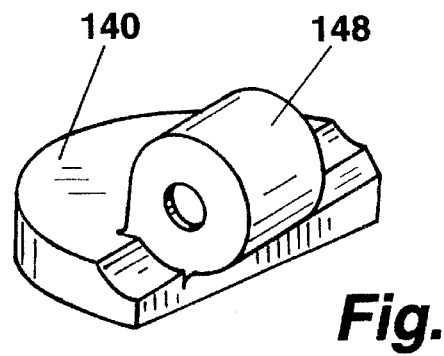
FIG. 13 is an isometric view of the plugger head second half as shown in FIGS. 9 and 11.
Figure 12:
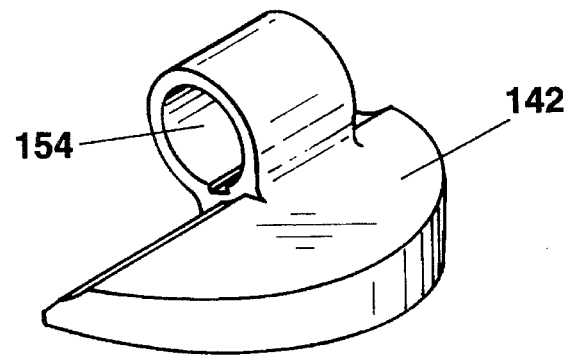
FIG. 12 is an isometric view of the plugger head first half as shown in FIGS. 8 and 10.

Referring next to FIGS. 2 and 3, the function of the plugger housing 20, jack 26, pivoted housing closure 24 and control bar 28 will now be described in greater detail.

First the pivoted housing closure member 24 will be described. This device is tubular, that is, it has an internal cylindrical surface 44 that slidably receives control bar 28. Further, it has an integral external truncated spherical surface or ball portion 46. Ball portion 46 rests in the lower half of a ball socket in the form of a plate 48 having a passageway therethrough defined by a semi-spherical surface 50, the plate being secured to the upper portion 52 of plugger housing 20. A cover plate 54 also has a passage way therethrough defined by a semi-spherical surface 56. Cover plate 54 is secured to the plunger housing upper portion 52, such as by threading. The combined surfaces 50 and 56 serves to capture and pivotally support ball portion 46 of housing closure member 24. The upper end of housing closure member 24 is attached to the lower end of jack 26. Specifically, the upper tubular portion of closure member 24 is provided with an integral, radially extending flange portion 58 that is captured between thrust bearings 59A and 59B. Thrust bearing 59B is split so that it can be assembled around the tubular portion of closure member 24. Thrust bearings 59A and 59B, with flange portion 58, are retained in a recess 60 in a jack bottom end plate 61 by means of a retaining ring 62. Thus, jack 26 is pivotally supported by closure member 24. Further, jack 26 is rotatable with respect to closure member 24 as provided by thrust bearings 59A and 59B.

The jack includes the tubular housing 26 closed by the lower end plate 61 and by an upper end plate 63. End plates 61 and 63 have openings therethrough receiving control bar 28. Jack housing 26 is tubular so that control bar 28 passes through the jack housing.

The interior components of jack housing 26 are best seen in FIG. 3. Positioned within housing 26 and received on control bar 28 is a lower actuator 64, a release actuator 66, an upper actuator 68, a coiled compression spring 70 that compressibly extends between release actuator 66 and upper actuator 68, and spring washers 72. The spring washers are positioned between lower actuator 64 and lower end plate 61. A detailed illustration of the actuators 64, 66 and 68 are shown in FIGS. 14–21 to which reference will now be made.

Figure 17:
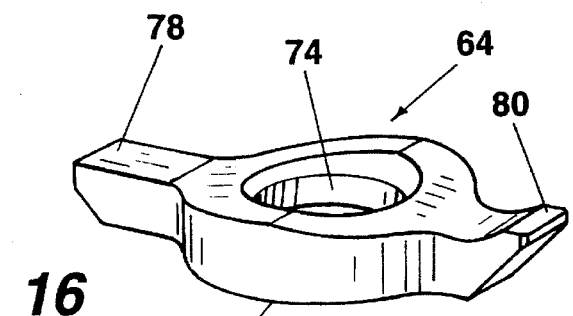
FIG. 17 is an isometric view of a lower actuator as employed in the control bar jack.
Figure 18:
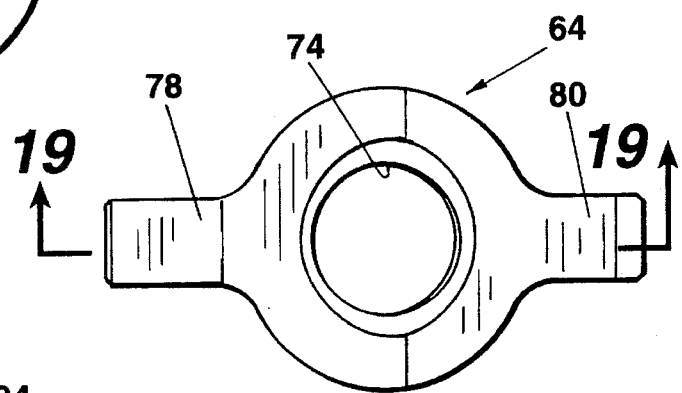
FIG. 18 is a top plan view of the lower actuator of FIG. 17.
Figure 19:
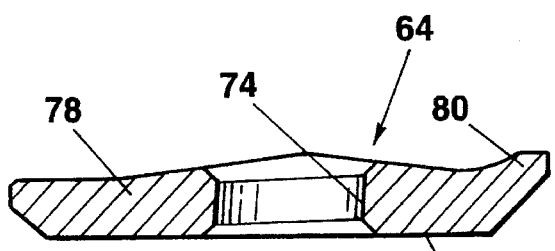
FIG. 19 is a cross-sectional view of the lower actuator taken along the line 19—19 of FIG. 18.

Lower actuator 64 is shown in FIGS. 17, 18 and 19. It is an integral member having a cylindrical opening 74 therethrough. The axis of the opening being slightly off place with respect to the base 76. The lower actuator has a integral extending tang portion 78 against which a jack handle operates and a second tang portion 80 that extends through an opening 82 in the jack housing 26 as shown in FIGS. 2 and 3.

The actuation of the lower actuator 64 will be described subsequentially.

Figure 14:
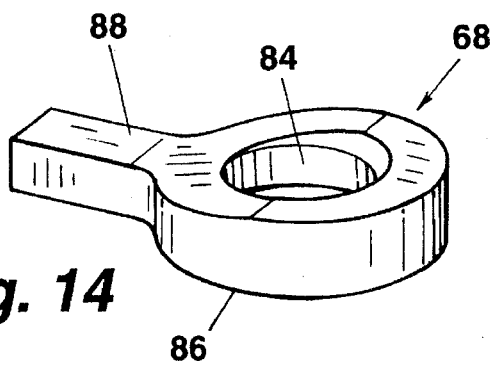
FIG. 14 is an isometric view of the upper actuator component of the control bar jack.
Figure 15:
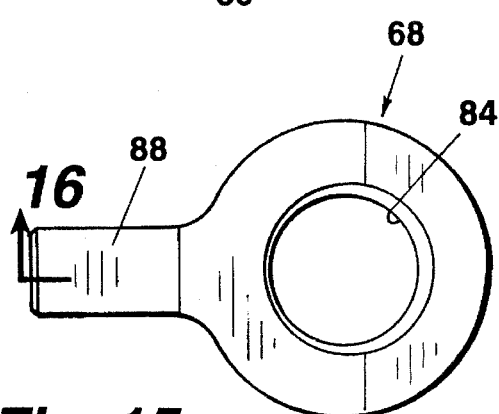
FIG. 15 is a top plan view of the upper actuator of FIG. 14.
Figure 16:
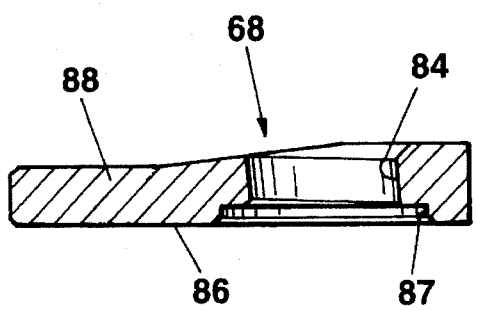
FIG. 16 is a cross-sectional view of the upper actuator as taken along 16—16 of FIG. 15.

Referring to FIGS. 14, 15, and 16, the upper actuator 68 is illustrated. It is an integral member having a cylindrical opening 84 therethrough. The axis of cylindrical opening 84 is at an angle with respect to the upper actuator base surface 86. The upper actuator has an integral tang portion 88 against to which a jack handle operates as will be described subsequentially.

Figure 20:
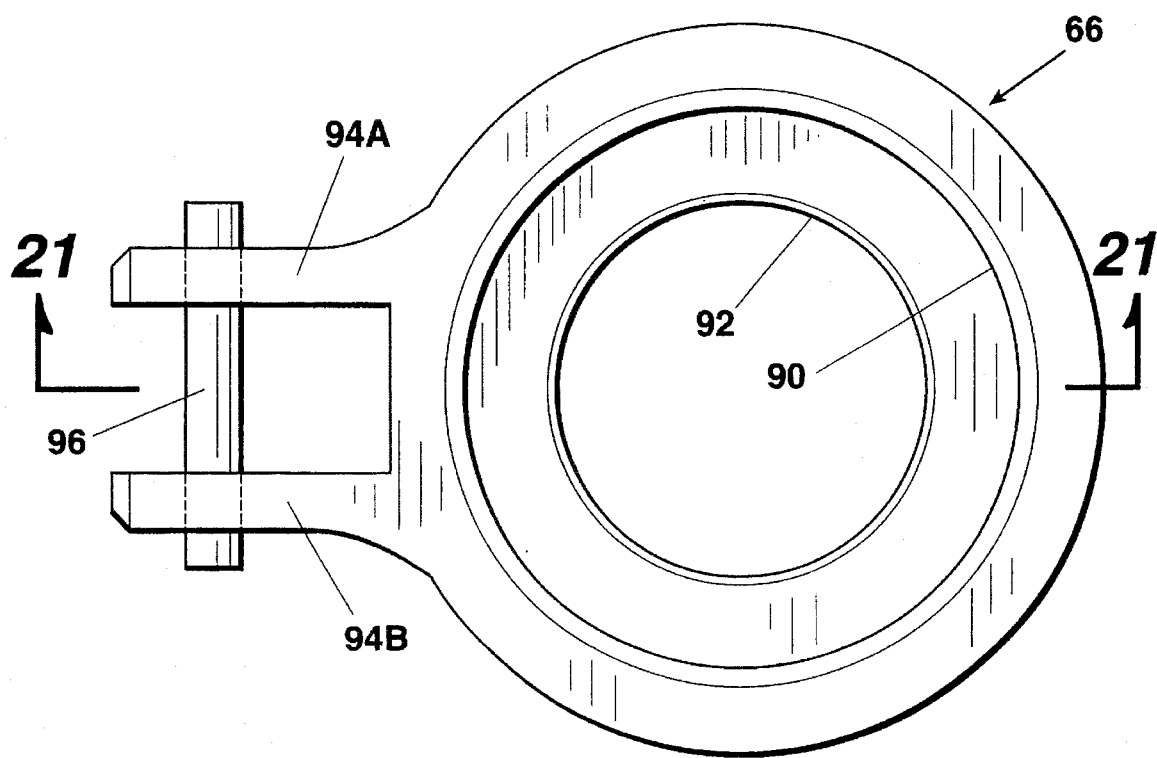
FIG. 20 is a top plan view of the release actuator that is employed with the control bar jack.
Figure 21:
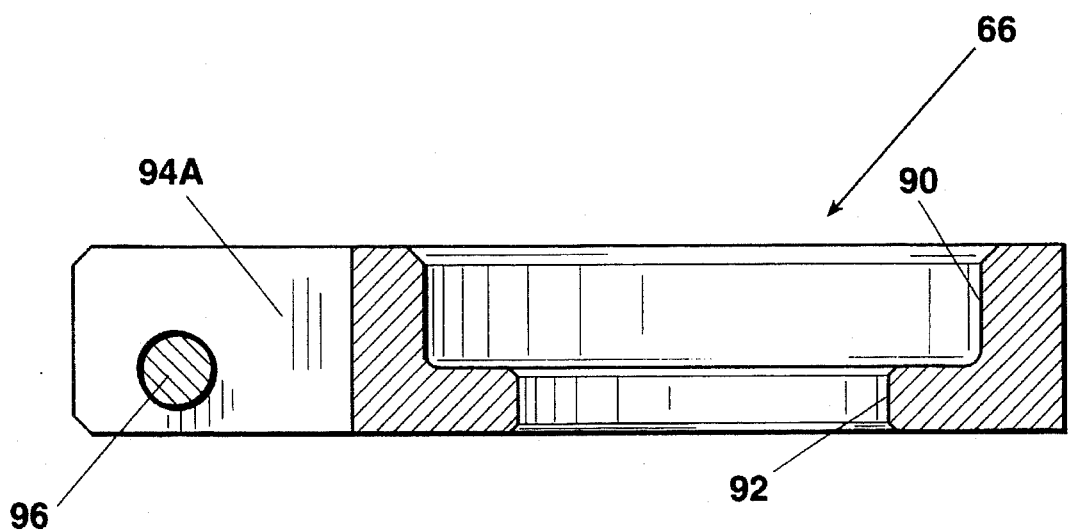
FIG. 21 is a cross-sectional view of the release actuator as taken along the line 21—21 of FIG. 20.

FIGS. 20 and 21 illustrate the release actuator 66. It is a unitary metallic device such as steel, having a larger diameter recess 90 therein and a concentric cylindrical opening 92. The cylindrical opening 92 is a diameter slightly larger than the external diameter of cylindrical control bar 28. Recess 90 receives the lower end of spring 70, as shown in FIG. 3. The upper end of spring 70 is received by an enlarged diameter recess 87 formed in the base surface 86 of the upper actuator 68, as shown in FIG. 16.

Release actuator 66 has an integral spaced apart tang portions 94A and 94B, each having an opening therein that supports pin 96. The tang portions 94A and 94B are spaced apart to receive the forward end of a jack handle which will be subsequentially described.

Referring back to FIG. 3, the operation of the jack to raise and lower control bar 28 will now be described. Extending from the exterior sidewall of jack housing 26 are spaced apart bost 98, one of which is seen in FIG. 3. Bosts 98 are spaced apart substantially equal to the spacing between the tang portions 94A and 94B of release actuator 66 as shown in FIG. 20. Pin 100 is received by bost 98.

The control bar 28 is raised and lowered utilizing jack 26 by means of the manual operation of a jack handle 102. Jack handle 102 includes a forward flat portion 104 having a lower curved portion 106 and an upper notch 108 that is configured to engage pin 96 and 100 during jacking operations.

The integral tang portion 78 of lower actuator 64, tang portions 94A and 94B of release actuator 66, and tang portion 88 of upper actuator 68 extends through a slot 110 in the tubular jack housing 26 enabling these members to be actuated by jack handle 102.

As shown in FIG. 3, jack handle 102 is in the position to engage pin 96 in release actuator 106. When jack handle 102 is moved downwardly, release actuator 66 is canted with respect to control bar 28 causing the release actuator to grasp the cylindrical control bar. The gripping force imparted to the control bar by the lower actuator is relatively small, imparted only through the preload generated by spring washers 72. This preload can be increased somewhat, but not a great deal, by advancing the preload adjustment downward, which effectively reduces the free space wherein the spring washers reside by lowering the position of the lower actuator. The orientation of the contact (gripping) points of the upper and lower actuators (as determined by the orientation of the holes through them) allow slippage of the control bar downward through the jack requiring only the amount of force up to the amount of the drag preload. The orientation of these contact points do not allow the control bar to travel upwardly. Any force, such as internal pipeline pressure, tending to push the control bar upwardly increases the gripping force of the lower actuator by the same amount. That force is transferred into stop 79 by tang 80. The purpose of stop 112 is to prevent over-rotation of the jack handle to the point that forces are imparted to the lower actuator such as may produce uncontrollable slip of the control bar upwardly through the jack when internal pipeline pressure is present.

To raise the control bar when internal pipeline pressure is tending to push it up, a downward force on the jack handle causes the release actuator to grip the control bar and thus produce a downward force on the tang 78 which somewhat reverses the grip-producing moment on the lower actuator by the force reacted on the opposite tang 80 by the stop 79. This reduction of grip-producing moment allows a controlled slip of the control bar upwardly.

To raise the control bar when no or little internal pressure is present, the same action is taken with the jack handle, but in this case, the upward force imparted by the release actuator simply pulls the control bar up through the lower actuator. The drag-adjust feature primarily ensures some grip-producing spring preload to ensure the control bar cannot move upward when internal pipe pressure is present. A secondary function allows compensating for the dead weight of the control bar assembly when raising the control bar with no internal pipeline pressure assisting. This can also be accomplished by imparting a bit of drag. The upward movement of the control bar will continue as the jack handle 102 is pivoted downwardly. The handle will contact stop 112 that is innerly formed with the jack housing of lower end plate 60. Repeated vertical actuation of the jack will permit the release actuator 66 to recede itself at a lower position by means of compression spring 70 so that on each actuation, control bar 28 is moved up incrementally.

To lower the control bar, jack handle 102 is placed in the dotted position as shown in FIG. 3. That is, where the notch 102 in the control bar forward flat portion 104 engages pin 100 and the jack handle curved portion 106 engages the tang portion 88 of upper actuator 68. When this actuator is pivoted downwardly, it grasps the external cylindrical surface of control bar 28 and forces it downwardly. Repeated vertical movements of jack handle 102 against the tang portion 88 of upper actuator 68 will move the control bar downwardly in incremental steps. The downward movement of the control bar is very important. When the device of FIG. 3 is attached is communication with the interior of a pipeline having high gas or liquid pressure, this hydraulic force is applied to tend to move control bar upwardly, the force being directly proportional to the pressure X the cross-sectional area of the control bar. It can be seen that in a pipeline having significant pressure, the hydraulic force tending to move control bar 28 upwardly could be so great that it could not be manually forced downwardly by an operator. By the provision of the jack system as described herein, the control bar 28 can be safely moved upwardly or downwardly by an operator by use of the jack handle and without the requirement of unusual strength.

To speed operations, it is desirable when there is little or no gas or liquid pressure in a pipeline to be able to manually move the control bar 28 downwardly. The weight of the control bar is supported by lower actuator 64 and therefore the preload of the actuator controls the force required to move the bar downwardly. The attitude of lower actuator 64 can be controlled by drag adjust lever 42 that applies a threaded portion 114 (as seen in FIG. 3) against tang portion 80 to control the preload of lower actuator 64 so as to regulate the amount of drag that is encountered when the control bar is manually moved downwardly.

Figure 22:
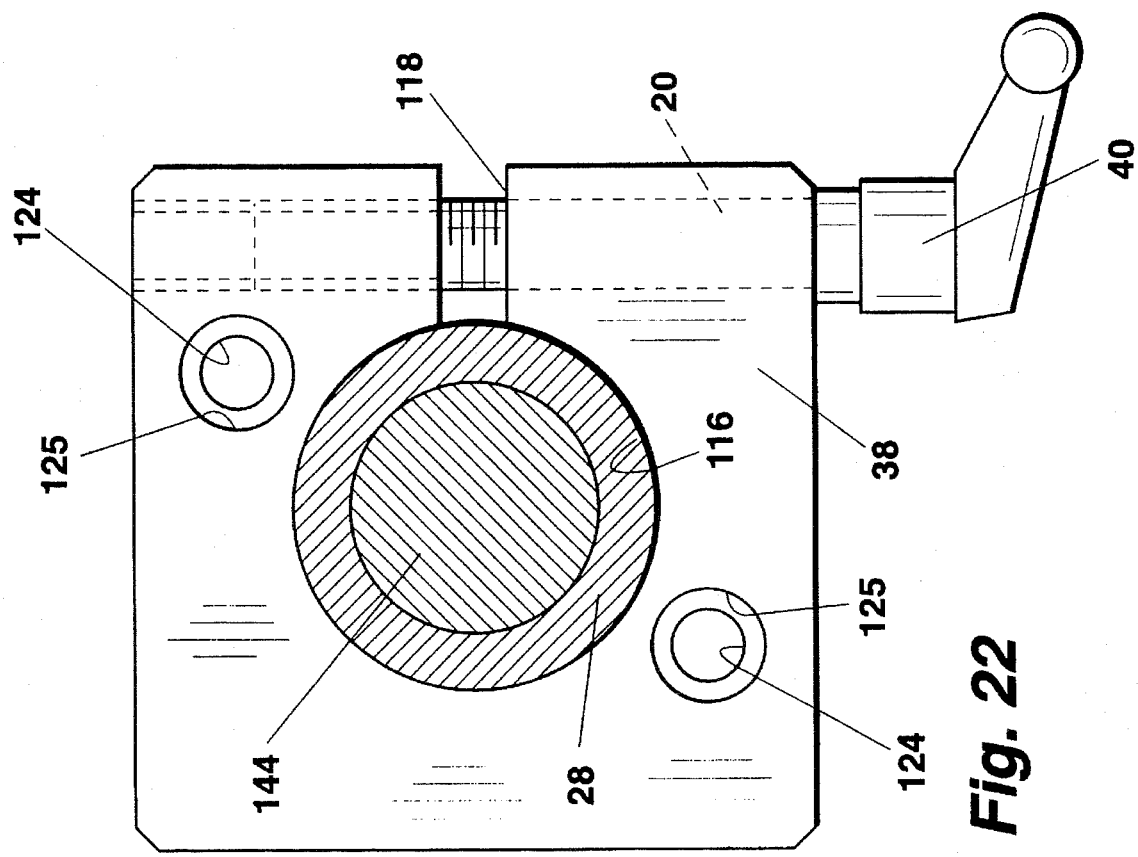
FIG. 22 is a top plan view of the clamp that surrounds the control bar and that is used to maintain the control bar at a selected elevational position relative to the plugger housing upper closure member.

It is important also to control the elevational and rotational position of the control bar. For this purpose, bar clamp 38 is affixed to the upper end plate 62 of jack housing 26. Bar clamp 38, as shown in FIG. 22, is a metal member having a cylindrical opening 116 therein that receives control bar 28. A slit 118 allows the bar clamp to be tightened on the control bar exterior surface by means of a bolt 120 that is controlled by lever 40. Thus, when lever 40 is rotated to tighten bolt 120, bar clamp 38 locks around the control bar so that is cannot be moved either elevationally or rotationally relative to jack housing 26. Bar clamp 38 is secured to jack housing upper end plate 63 by means of shoulder bolts 122 that are seen in FIGS. 1, 2, and 3 that extend through openings 124 in the bar clamp. Counter bores 125 and oversized holes 124 allow bar clamp 38 to float slightly relative to jack housing upper end plate 63 thus allowing bar clamp 38 to flex and grip control bar 28.

It is important for the operator to be able to control the pivotation of control bar 28 with respect to plugger housing 20 and thereby, with respect to the pipeline to which the plugger housing is supported. This is achieved by means of a pivoted latch as shown in FIG. 2. A boss 124 extends from the external surface of jack 26 and pivotally receives a threaded latch 126. Latch 126 pivots about a pin 128 in boss 124. Slidably located on threaded latch 126 is a catch 130 having a integral lip portion, the catch being retained by means of a wing nut 132. The lip portion of catch 130 is configured to engage a circumferential lip 134 built into the upper portion 52 of plugger housing 20. When control bar 28 is pivoted to the angle desired by the operator, the control bar being pivoted about the ball portion 56 of the housing closure member 24, the operator can retain the control bar in the selected pivoted position by engaging catch 130 with lip 134, by means of advancing wing nut 132 the position can be retained. A spring 136 received on threaded latch 126 applies resilient force to hold the catch 130 against wing nut 132, and to hold the threaded latch 126 down in the latched position, should the catch 130 disengage the lip 134, or in the up-right stored position.

Figure 23:
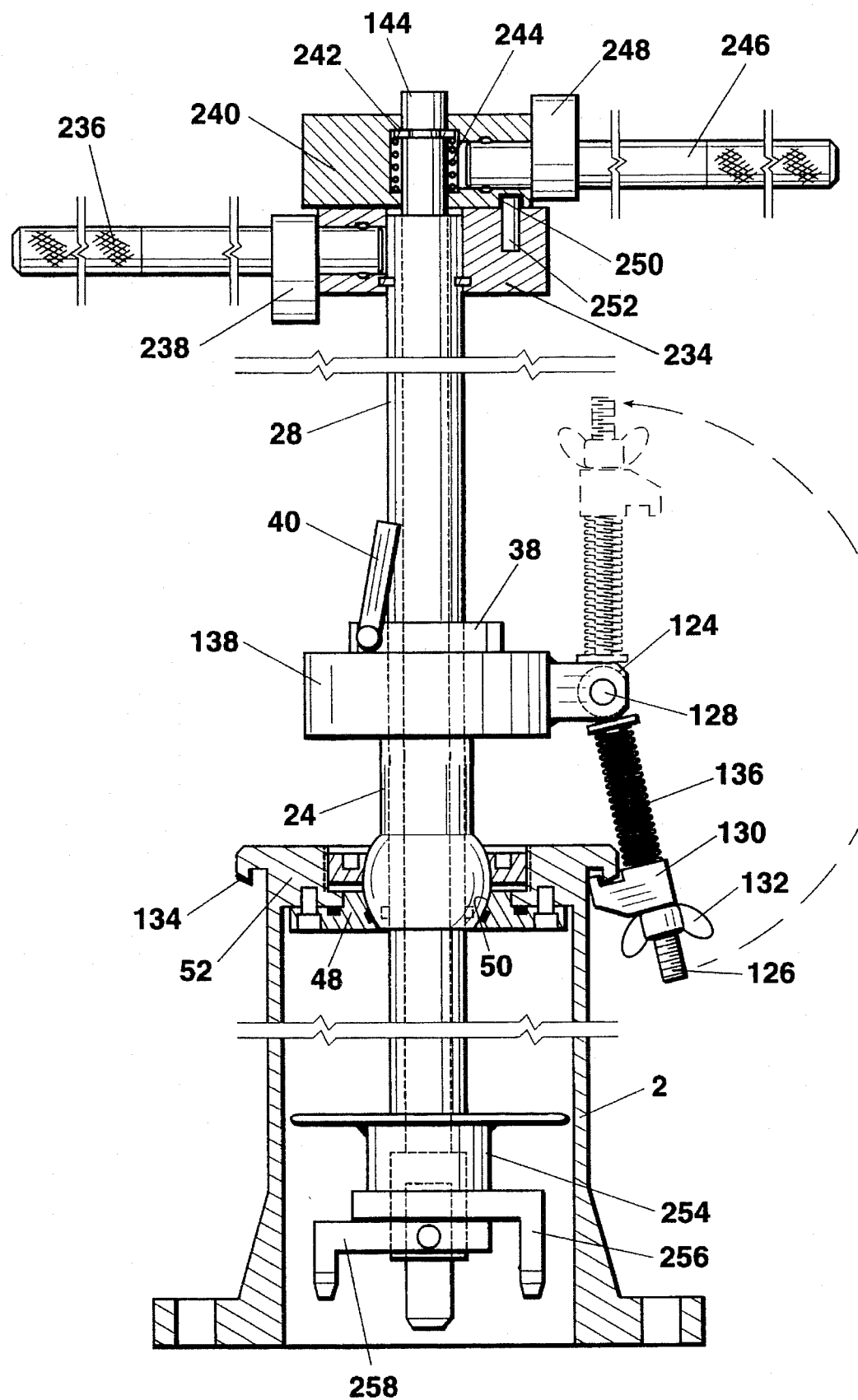
FIG. 23 is an elevational view showing the plugger housing in cross-section with the pivoting closure member secured to the top of the housing.

As previously eluded to the device for plugging the interior of a pipe, this invention can be practiced without the use of jack 26 if the pressure of the pipeline being plugged is not utterly great. FIG. 23 shows the apparatus as adapted for manual lowering and raising of control bar 28 in which the same ability to control the pivotal relationship of the control bar is provided. In FIG. 23, a housing flange 138 is utilized in place of jack 26 as described in FIGS. 1, 2, and 3. The pivoted housing closure member 24 is attached to housing flange 138 in the same way that it is attached to jack housing lower end plate as previously described. In this embodiment, the boss 124 that is used to control the pivotal position of control bar 28 is attached to the external surface of housing flange 138. The threaded latch 126 is pivotally secured to pin 128 and has catch 130, wing nut 132 and spring 136 as described with reference to FIG. 2. Thus, the threaded latch works the same way to maintain the control bar in a preselected angular attitude with or without the use of a jack.

In the arrangement of FIG. 23 wherein a jack is not employed, bar clamp 38 operated by lever 40 is secured to housing flange 138 and functions in the same way as described with reference to FIG. 2.

Control bar 28 may be used to provide a variety of functions internally of a pipeline, but a main purpose of the device is to install a plugger in a pipeline to close it against gas or liquid flow.

The disclosure provides three different types of pluggers, the first to be described is a folding plugger illustrated in FIGS. 4 and 8 through 12. As shown in the exploded view of FIG. 4, the folding plugger has a first plugger head 140 and a second plugger head 142. The control bar 28 is in the form of an outer tubular portion that is identified by the numeral 28 and an internal cylindrical bar 144. As shown in FIG. 4, the internal cylindrical bar 144 has an enlarged end portion 146 at the lower end that engages a tubular recess 148 in the first plugger head 140, the end portion 146 being held in the recess by means of bolt 150. The tubular outer portion 28 of the control bar has a stepped-down circular portion 152 that engages the tubular portion 154 of second plugger head 142. Key slots in members 146, 148, 152 and 154 engage keys 151 and 153 to control rotation of first plugger head 140 and second plugger head 142. Thus, the angular position of plugger heads 140 and 142 relative to each other are controlled by the rotational positions of control bar 28 and its internal bar 144.

FIGS. 9 through 12 illustrate the basic components first plugger head 140 and second plugger head 142 with the portions providing the tubular recesses 148 and 154. First plugger head 140 has one-half of an elastomeric cup 156 affixed to it and in like manner, second plugger head 142 has one-half of an elastomeric cup 158. When the plugger heads are rotated to lie in a uniform plane with each other, the elastomeric cups 156 and 158 join together to form a complete cup and to form a circumferential surface that engages the interior of a pipe to close off the interior of the pipe.

Referring to FIG. 4, upper handle connector 32 is affixed to internal cylindrical bar 144 and lower handle connector 34 is affixed to the outer tubular control bar 28. Thus, the handled connectors 32 and 34 rotatably position the bars 28 and 144 and thereby plugger head portions 140 and 142. As shown in FIGS. 5 and 6, the heads are each provided with a slot with means to receive a bolt so that the heads can be clamped onto cylindrical bar 144 and control bar 28 respectively. Upper handle connector 32 has an opening 160 therein that removably receives an upper handle 162 and lower handle connector 34 has an opening 164 therein that receives handle 166. By means of handles 162 and 166, the operator can control the position of plugger heads 140 and 142 to either fold them into parallel relationship with each other or fold them in a uniform plane to form a full diameter plugger head to close off the interior of the pipe.

It is important that the orientation of the plugger heads 140 and 142 relative to each other be maintained as selected by the operator. For this purpose, as shown in FIG. 7, upper handle connector 32 has a vertical opening 168 therein that receives a plunger 170 positioned by a guide insert 172 and biased in the downward position by spring 174. An integral enlarged diameter washer portion 176 is formed on plunger 170.

Handle 162 has a notch 178 therein forming opposed lips that engage integral washer portion 176. When handle 162 is rotated by the operator, plunger 170 is withdrawn, but when rotational effort is removed, spring 174 automatically extends plunger 170.

Lower handle connector 34 has spaced apart openings 180 that can receive plunger 170. The openings 180 are arranged to retain the folded plugger head, that is, plugger heads 140 and 142 either in the fully folded or fully unfolded position. Thus, the operator can remove handles 162 and 166 and when in the fully folded or unfolded position, plunger 170 will enter into one of the openings 180 to hold the folded plugger head in the selected position. This system enables the operator to lock the folding plugger head either in the folded or unfolded position without removing his hands from levers 162 and 166—an important safety feature.

Figure 24:
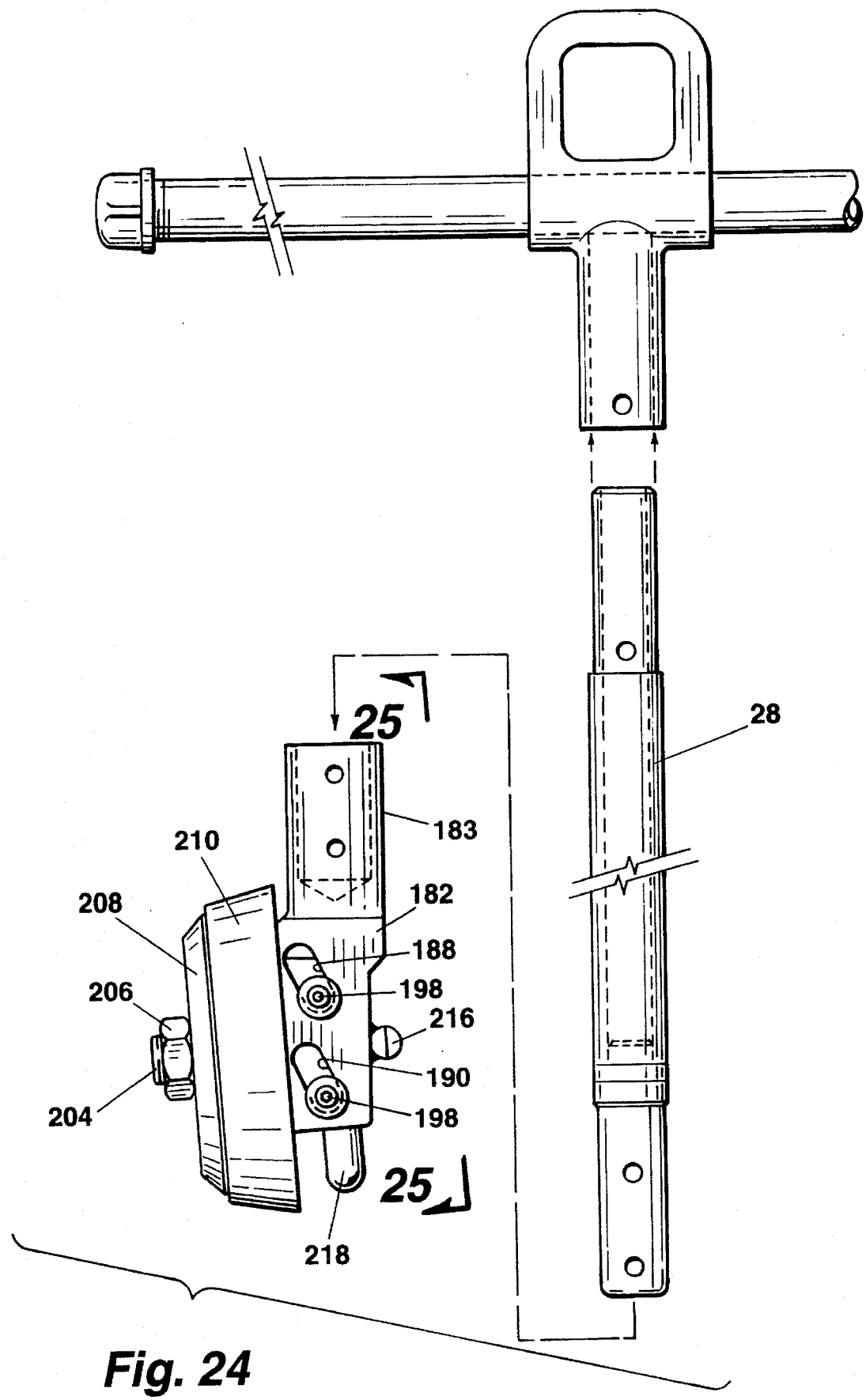
FIG. 24 is an exploded view of one type of plugger head.
Figure 26:
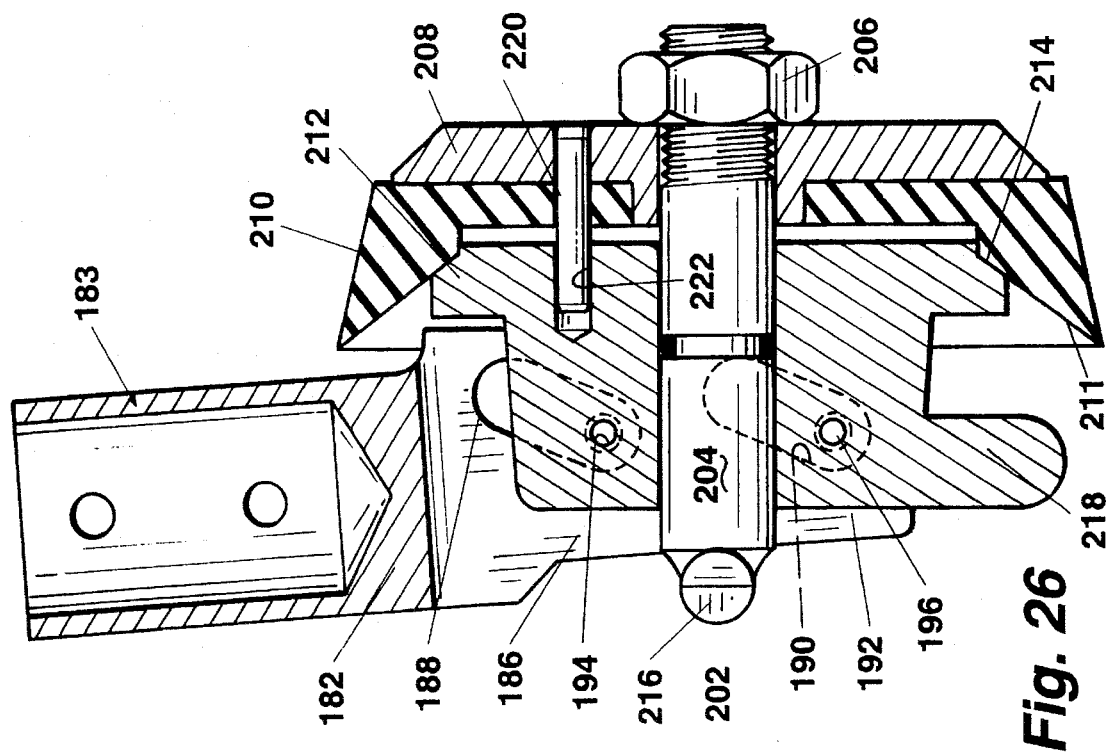
FIG. 26 is a cross-sectional elevational view of the plugger head as taken along the line 26—26 of FIG. 25 illustrating the apparatus by which the closure cup can be axially advanced into seating engagement with the interior of a pipe.
Figure 25:
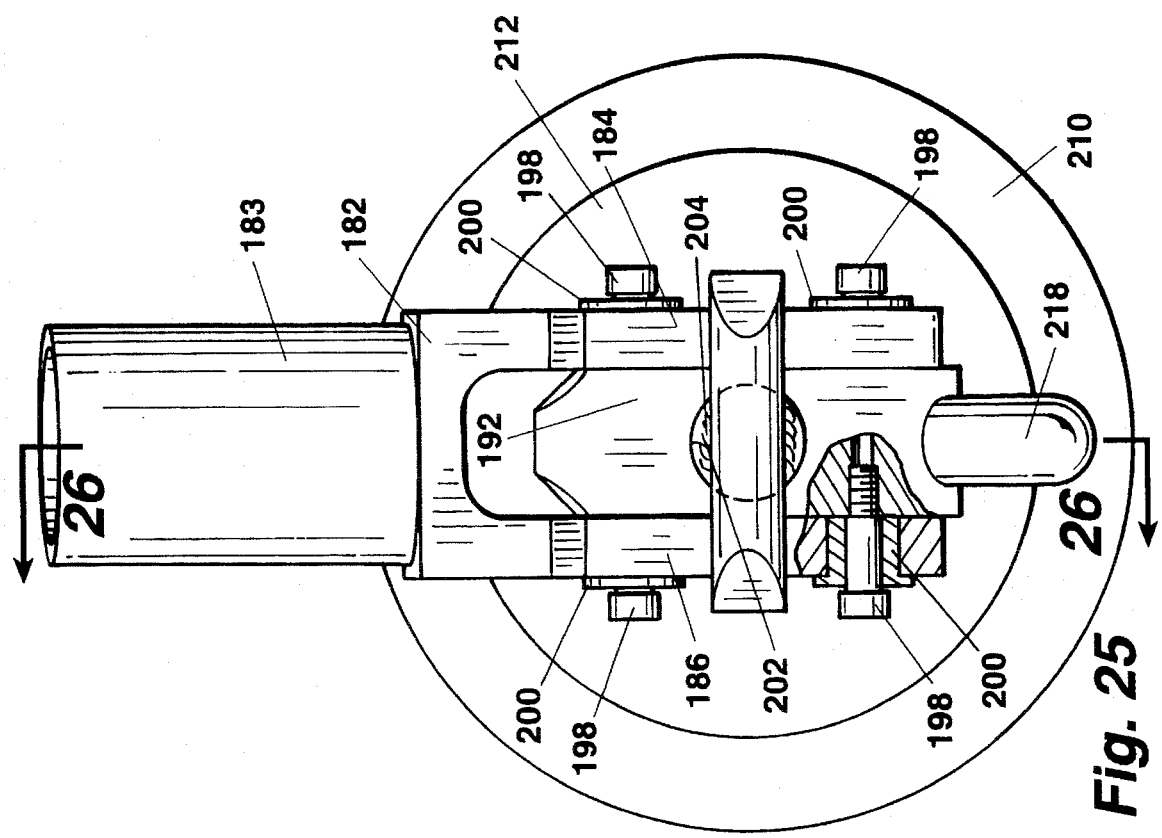
FIG. 25 is an elevational rear view of the plugger head taken along the line of 25—25 of FIG. 24.

FIGS. 24, 25 and 26 show an alternate type of plugger head. As illustrated in FIG. 24, this type of plugger head can utilize a control bar 28 that is unitary, that is it does not have a separate internal bar. Control bar 28 is cylindrical and must be actuated by means of the jack as described with reference to FIG. 3 in order to provide sufficient force to activate the plugger backing plate 192 as will be described later. Secured to the lower end of control bar 28 is a plugger body 182 having an upper tubular portion 183 that telescopically receives the lower end of control bar 28 so that it can be bolted to the control bar.

As best seen in FIG. 25, plugger body 182 has two integral spaced apart paralleled fork portions 184 and 186. Each of the fork portions has an elongated upper slot 188 and lower slot 190. The plane of upper slots 188 is paralleled to the plane of lower slots 190 and these planes are at an acute angle relative to the longitudinal axis of the tubular portion 183 which, in turn, means that slots 188 and 190 are at an acute angle with respect to the longitudinal axis of control bar 28.

Slidably received between fork portions 184 and 186 is a plugger backing plate 192. Plugger backing plate 192 has opposed parallel sides that slidably engage the spaced apart plugger body fork portions 184 and 186 so that backing plate 192 is securely held between the fork portions. An upper threaded opening 194 is provided in backing plate 192 and, in like manner, a lower threaded opening 196 is provided. These openings receive opposed bolts 198, each bolt supporting a roller 200. Thus, backing plate 192 is positioned between the fork portions of plunger body at the end of the control bar but the backing plate can move laterally of the fork portions as it is traversed upwardly or downwardly according to the lateral direction.

A central opening 202 receives a bolt 204 that is threaded and has a nut 206 on the forward end. Received on bolt 204 is nose plate 208 that holds in place an elastomeric cup 210. The backing plate 192 has an integral flange portion 212 that supports elastomeric cup 210. The flange portion 212 of backing plate 192 has a sloped circumferential surface 214 that engages the rearward conical shaped portion of cup 210. This sloped surface engages the conical internal surface of cup 210 and as it is forced outwardly it tends to expand elastomeric cup 210 to thereby more securely fit against the interior cylindrical wall of a pipe.

The rearward end of bolt 204 receives bar 216 welded to it to limit the forward motion of the bolt, as it engages the rear edges of fork portions 184 and 186.

Secured to lower end of backing plate 192 is a foot portion 218, which may, as illustrated, be integrally formed with the backing plate. The function of foot portion 218 is to engage the internal lower surface of a pipe in which the plugger is forced. As downward pressure is applied by jack 26 on control bar 28 and thereby onto backing plate 192, foot portion 218 engages the interior of the pipe and pushes backing plate upwardly causing it to move forwardly with respect to slots 188 and 190 and thereby force the backing plate 192 into cup 220 which is held in place by nose plate 208 via bolt 204 and nut 206, thus expanding cup 210 and forcing it out radially into the interior of a pipe. Jack 26 which applies the force necessary to accomplish this expansion is secured by setting clamp 38 and latch 126. Foot portion 218 may be provided with a wheel (not shown) to roll on the interior surface of a pipe as the plugger is positioned in a pipe.

A pin 220 is secured to nose plate 208 and extends through elastomeric cup 210 and opening 222 in backing plate 192. Pin 220 serves to guide and position the nose plate and elastomeric cup 210 as it is moved with respect to backing plate 192. Pin 220 thus guides the nose plate and cups as these members move with respect to each other.

Figure 27:
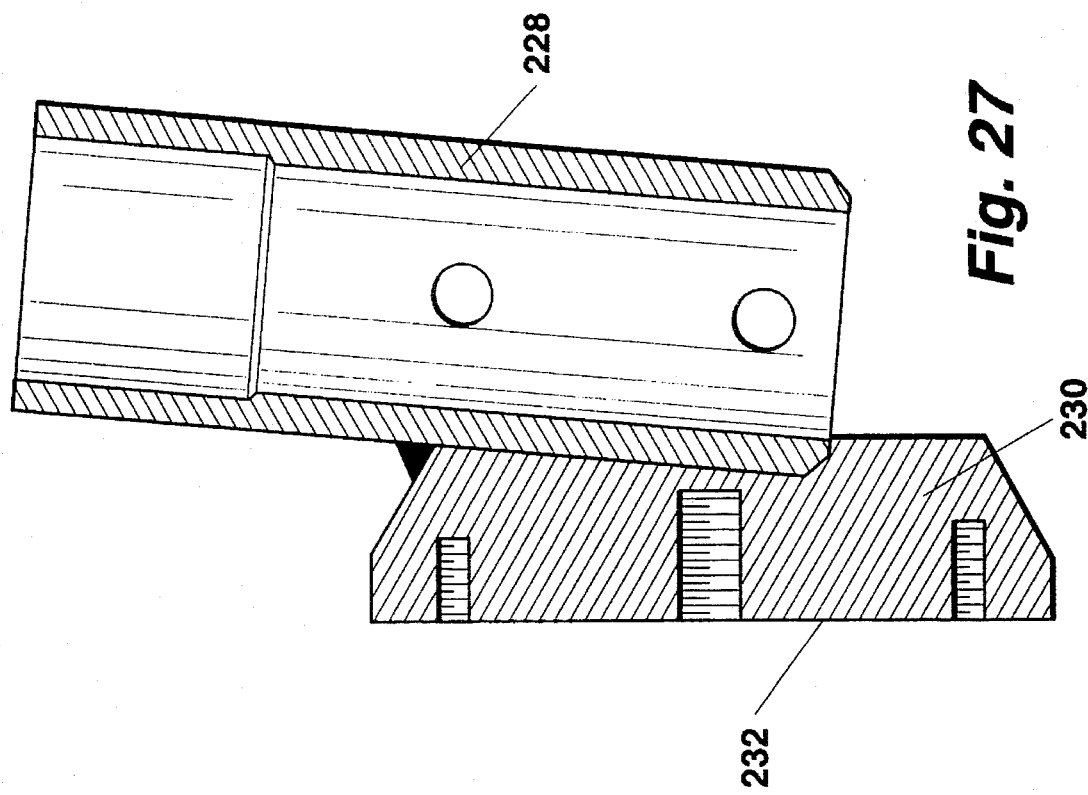
FIG. 27 is a cross-sectional view of a fixed plugger head that can be used with the invention. The fixed plugger head is supported at the lower end of a control bar and supports an elastomeric cup, the cup not being shown. This type of plugger head can be moved into the interior of the pipeline by the pivotal actuation of the control bar.

The third type of plugger head is shown in FIG. 27, a tubular fixed plugger body 228 is adapted to be received on the lower end of a cylindrical control bar 28 of the type shown in FIG. 24, that is the type that does not require an internal rotating bar portion. Secured to the fixed plugger body 228 is a cup support 230. The cup support 230 is cylindrical having a planar forward surface 232 that is configured to receive an elastomeric cup thereon, the cup not being shown. The fixed cup support of FIG. 27 will normally employ a nose plate to hold the cup in position such as nose plate 208 as described in FIG. 26. The fixed cup support of FIG. 27 is a simple and economical device for insertion into a pipe wherein the operator moves the cup support 230 into the interior of the pipe and then pivots the control bar in a direction to move the cup that is supported by the cup support into the interior of the pipe adjacent to the opening to thereby close the pipe.

FIG. 23 shows alternate embodiments of the invention. Control bar 28 has affixed at the upper end thereof a first control block 234. The inward end of a handle 236 is rotatably received in a recess in first control block 234. Handle 236 has an eccentric 238 positioned adjacent first control block 234. Affixed to the upper end of internal cylindrical bar 144 is a second control block 240. Specifically, second control block 240 has an opening therethrough that receives internal cylindrical bar 144. Second control block 240 is axially displaceable with but rotationally locked to internal cylindrical bar 144. A keeper 242 received in an external groove on internal cylindrical bar 144 engages a compression spring 244 which fits against a lower edge of the recess in second control block 240. Spring 244 urges second control block 240 downwardly in the direction towards first control block 234.

Control blocks 234 and 240 are offset relative to each other so that when handle 236 is rotated, eccentric 238 engages second control block 240 to displace it upwardly, compressing spring 244.

Second control block 240 has a recess that rotatably receives the inner end of a handle 246 which has an eccentric 248. When handle 246 is rotated, eccentric 248 engages first control block 234 to displace second control block 240 upwardly, compressing spring 244. Thus, second control block 240 is displaced upwardly by the rotation of either handle 236 or 246 or, of course, the handles may be simultaneously rotated to upwardly displace second control block 240.

Second control block 240 has a small diameter recess 250 therein in the surface that engages first control block 234. A pin 252 extends from the upper surface of first control bar 234. When handles 236 and 246 are not rotated, that is, when the control blocks are held in contiguous relationship by compression spring 244, pin 252 enters recess 250 to lock control blocks 234 and 240 relative to each other, thus, preventing the rotation of internal cylindrical bar 144 and control bar 28 relative to each other. Obviously, more than one recess 250 may be provided in second control block 240 enabling the operator to lock cylindrical bars 144 and 28 relative to each other in more than one position. Thus, the arrangement of FIG. 23 is an alternate method of controlling the relationship of the bars to each other as compared to the system that has been described with reference to FIGS. 5, 6, and 7.

FIG. 23 shows how the device for plugging the interior of a pipe as has been disclosed herein can be used for purposes other than setting a plugging head. In FIG. 23 a completion plug holder 254 is supported on the lower end of control bar 28. Completion plug holder 254 has an actuating member 256 extending from it. A second completion plug holder 258 is affixed to the lower end of internal cylindrical bar 144. Completion plug holders 256 and 258 can be used to install a completion plug (not shown) in a saddle fitting (see item 14 of FIG. 1 ) after a pipe plugging operation has been completed. That is, the plugging devices as described herein are primarily for use to temporarily close off a pipe. After their need is no longer required, the plugger heads are pulled out of the pipe, but the opening through which the plugger heads are installed must be sealed. For this purpose, the usual procedure is to thread or use a locking-type plug (not shown) in the top of saddle fitting 14 to thereby enable valve 18 to be removed. After valve 18 is removed, a blind flange may be affixed to saddle fitting flange 16 to complete the operation. Completion plug holder 254 having actuating members 256 and 258 are illustrated for the purpose of showing that the device for plugging the interior of a pipe as been described herein can be used for this and other purposes.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A device for plugging the interior of a pipe having an internal cylindrical surface, the pipe being penetrated by an access opening of a diameter substantially equal to the diameter of the pipe internal cylindrical surface, the plugging device comprising:

a vertically oriented body;

a backing plate, said body and said backing plate forming mating parts, one of said body and said backing plate having spaced apart integral fork portions with a space therebetween, the fork portions each having a pair of aligned slots therein, said body having a longitudinal axis and the slots extending in paralleled planes that are at an acute angle relative to a plane of the body longitudinal axis and the other of said body and said backing plate having opposed paralleled side surfaces positioned between said fork portions;

a pair of spaced-apart axles extending from each said side surface, the axles being received in said slots so that said backing plate is retained by said body in a manner to permit vertical and lateral motion of said backing plate relative to said body as said axles move in said slots, the backing plate having a forward surface with a frustoconical circumferential edge;

an elastomeric cup supported in variably spaced sliding relationship to said backing plate, the cup having a circumferential outer sealing surface of diameter slightly greater than the internal diameter of the pipe to be plugged, the cup having a rearward surface facing said backing plate forward surface, the cup rearward surface being partially defined by an internal circumferential frustoconical surface that mates with said backing plate frustoconical edge;

means to engage the interior surface of a pipe to be plugged to cause said backing plate to be slidably displaced forwardly of said body as said body is forced downwardly into a pipe to be plugged, said backing plate frustoconical circumferential edge engaging said cup internal circumferential frustoconical surface whereby said cup is outwardly expanded as said backing plate is forced against said cup rearward surface to provide improved sealing relationship between said cup sealing surface and a pipe internal cylindrical surface; and means to secure said plugger body to the lower end of an elongated control bar by which the device is inserted into a pipe to be plugged.

2. A plugging device according to claim 1 wherein said backing plate has a central opening therethrough between and paralleled to said paralleled side surfaces, and including:

a cylindrical bolt slidably displaceably received in said backing plate opening, said cup being secured to a forward end of the bolt to provide said variably spaced sliding relationship of said cup relative to said backing plate.

3. A plugging device according to claim 2 including:

a rigid nose plate secured to said shaft forward end, said elastomeric cup having a forward surface in contact with said nose plate.

4. A plugging device according to claim 3 wherein said backing plate has a guide opening therein displaced from and paralleled to said first mentioned central opening and including:

a guide pin supported by and extending from said nose plate, the guide pin being slidably received in said backing plate guide opening whereby the axial orientation of said nose plate and said elastomeric cup relative to said backing plate is retained as said nose plate and elastomeric cup are displaced relative to said backing plate.

5. An apparatus for plugging the interior of a pipe having an internal cylindrical surface, the pipe being penetrated by an access opening, the plugging device comprising:

an upright tubular plugger housing having means at a lower end for attachment to a pipe in communication with an opening in the pipeline;

an elongated vertical cylindrical control bar having a plugger at a lower end thereof, the plugger being operable to plug a pipe after it has been inserted through an opening into the pipe;

a housing closure member secured to an upper end of said housing, the closure member having an opening therethrough sealably and slidably receiving said control bar;

a jack received on said control bar and having a lower end secured to said housing closure member, the control bar extending through an upper end of said jack;

a jack handle pivotally extending from said jack and reciprocally operable in a plane of said control bar;

plugger positioning means secured to said control bar above said jack;

said jack handle being reciprocally operable to axially advance said control bar to move said plugger into the interior of a pipe and to permit said plugger to be withdrawn from a pipe.

6. Apparatus for plugging a pipe according to claim 5 wherein said jack includes operable means in a first position to cause said control bar to be moved in a first direction towards said plugger housing as said handle is reciprocally operated and in a second position to cause said control bar to be moved in a second direction away from said plugger housing as said handle is recirocally operated.

7. Apparatus for plugging a pipe according to claim 5 wherein said plugger housing closure member includes:

a collar member having, at least in part, a truncated spherical external surface, the collar member having a cylindrical passageway therethrough that slidably receives said control bar, said jack being secured to an upper end of the collar member;

a first and a second closure plate, each having an opening therethrough defined by a truncated spherical surface, the plates being positioned together so that their truncated spherical surfaces surrounds and capture at least a portion of said collar member ball portion, said plates forming said housing closure member whereby said collar member is pivotally supported to said plugger housing to thereby permit said control bar to be pivotally positioned with respect to said plugger housing to move said plugger into or out of plugging position in a pipe.

8. Apparatus for plugging a pipe according to claim 5 including means of locking said jack and thereby said control bar in a selected angle relative to said plugger housing.

9. Apparatus for plugging a pipe according to claim 5 wherein said means of locking said jack and thereby said control bar in a selected angle relative to said plugger housing comprises:

a pivoting latch extending externally of and between said jack and said plugger housing having means of removably interlocking them at preselected angles.

10. Apparatus for plugging a pipe according to claim 9 wherein said latch is in the form of an elongated threaded member pivoted at one end to one of said jack and plugger housing, the other of said jack and plugger housing having an externally hook element extending therefrom;

a catch having an opening therein slidable on said elongated threaded member adapted to removable lock onto said hook element; and a nut threaded onto said threaded member to retain said catch in a selected position.

11. Apparatus for plugging a pipe according to claim 10 including a compression spring received on said threaded member between said nut and said catch.

12. Apparatus for plugging a pipe according to claim 5 wherein said jack includes:

a top plate affixed to said jack housing and having an opening therethrough slidably receiving said control bar;

a tubular jack housing closed at a top end by a top plate and at a bottom end by a bottom plate, the top and bottom plates having openings therethrough receiving said control bar;

a lower actuator positioned within said jack housing and having an opening therethrough receiving said control bar, the lower actuator being in engagement with said bottom plate;

an upper actuator positioned within said jack housing and having an opening therethrough receiving said control bar, the upper actuator being in engagement with said top plate;

a releasing actuator positioned within said jack housing and having an opening therethrough receiving said control bar, the releasing actuator being in engagement with said lower actuator;

a compression spring received on said control bar between said releasing actuator and said upper actuator, said lower actuator serving to normally bind against said control bar to prevent upward motion of the control bar, said control bar being movably axially upwardly advanced by the application of force between said releasing actuator and said lower actuator and said control bar being movably axially downwardly advanced by the application of force between said upper actuator and said top plate.

13. Apparatus for plugging a pipe according to claim 12 including:

an elongated removable jack handle having a camming pry member at an inner end, the jack handle being manually removably positionable in a first position to provide force between said release actuator and said lower actuator to raise said control bar and in a second position to provide force between said jack housing top plate and said upper actuator to lower said control bar.

14. Apparatus for plugging a pipe according to claim 12 including at least one spring washer between said jack housing bottom plate and said lower actuator.

15. Apparatus for plugging a pipe according to claim 12 including a drag adjust member for controlling the preload of said lower actuator member relative to said control bar to thereby regulate the force required to move said control bar downwardly.

16. An apparatus for performing an operation in the interior of a pipe having an internal cylindrical surface, the pipe being penetrated by an access opening, comprising:

an upright tubular housing having means at a lower end for attachment to a pipeline in communication with an opening in a pipeline;

a housing closure member secured to an upper end of said housing, the closure member having an opening therethrough;

an elongated upright control bar sealably and slidably received in said opening in said housing closure member, the control bar being formed of an outer tubular portion and a concentric internal portion rotatably received in said tubular portion, the internal portion extending in length beyond upper and lower end of the tubular portion, the control bar outer tubular portion and internal portion each having a lower end that are adapted to perform an operation in a pipe;

a first head plate affixed to an upper end of said control bar outer tubular portion and a second head plate affixed to an upper end of said control bar internal portion, the head plates being paralleled to and adjacent each other;

handles extending from each of said head plates providing means of rotating said control bar outer tubular portion and internal portion, at least one handle being rotatable with respect to the head plate from which it extends; and locking means of releasably rotationally locking said first and second head plates to each other, the locking means being controllable by the rotation of one of said handles.

17. An apparatus for performing an operation in the interior of a pipeline according to claim 16 wherein one of said head plates has at least one opening therein spaced from said control bar portion and the other of said head plates has a spring biased axially positionable plunger supported therein that is extendable into and retractable from said at least one opening in said first mentioned head plates; and means controllable by the rotation of a said handle relative to the head plate from which it extends to retract said plunger to permit said head plates to be rotated relative to each other.

18. An apparatus for performing an operation in the interior of a pipe according to claim 16 wherein the operation is for plugging the interior of the pipe and comprising:

a first portion of a folding plugging means affixed to a lower end of said control bar outer tubular portion and a second portion of a folding plugging means affixed to a lower end of said control bar internal portion, the plugging means being foldable for insertion into or removal from a pipeline and unfoldable to plug a pipeline.

19. An apparatus for plugging the interior of a pipe having an internal cylindrical surface, the pipe being penetrated by an access opening, the plugging device comprising:

an upright tubular plugger housing having means at a lower end for attachment to a pipe in communication with an opening in the pipe;

an elongated vertical cylindrical control bar having a plugger at a lower end thereof, the plugger being operable to plug a pipe after it has been inserted through an opening into the pipe;

a collar member having, at least in part, a truncated spherical external surface, the collar member having a cylindrical passageway therethrough that slidably receives said control bar;

a first and a second closure plate, each having an opening therethrough defined by a truncated spherical surface, the plates being positioned together so that their truncated spherical surfaces surround and capture at least a portion of said collar member truncated spherical external surface, said plates being affixed to and closing an upper end of said plugger housing whereby said collar member is pivotally supported to said plugger housing to thereby permit said control bar to be pivotally positioned with respect to said plugger housing to move said plugger into or out of plugging position in a pipe;

an elongated threaded member pivoted at one end to one of said collar member and plugger housing, the other of said collar member and plugger housing having an external rim extending therefrom;

a hook slidable on said elongated threaded member and removably attached to said rim; and means to retain said hook in selected positions on said elongated threaded member providing means of locking said collar member and thereby said control bar in a selected angle relative to said plugger housing.

20. Apparatus for plugging a pipe according to claim 19 including a compression spring received on said threaded member between said nut and said catch.

* * * * *